TELEVISION SCANNING SYSTEM

Filed Aug. 29, 1950

INVENTOR.
ERNEST O. LAWRENCE
BY
Lippincott & Smith
ATTORNEYS.

Patented Nov. 25, 1952

2,619,612

UNITED STATES PATENT OFFICE 2,619,612

TELEVISION SCANNING SYSTEM

Ernest O. Lawrence, Berkeley, Calif., assignor to Chromatic Television Laboratories, Inc., San Francisco, Calif., a corporation of California Application August 29, 1950, Serial No. 182,037

5 Claims. (Cl. 315—22)

Figure 1:
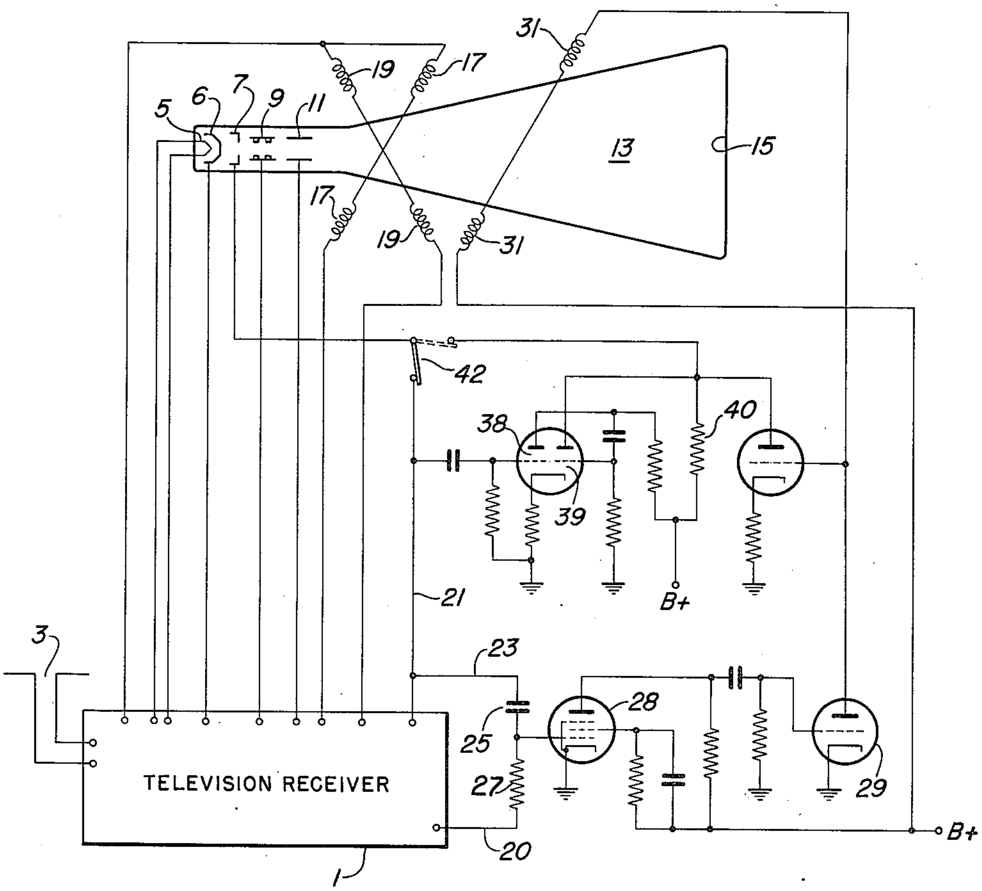

This invention relates to methods of scanning in television receivers, and is primarily applicable to receivers of the cathode ray type wherein the television image is produced by scanning a cathode ray beam across a luminescent target or screen in a bi-dimensional manner, i. e., in one dimension at a relatively low or "field scanning" rate and in a perpendicular dimension at a much higher or "line scanning" rate. Simultaneously the intensity of the beam is modulated by the video signals, increasing or decreasing in intensity as the signal becomes more or less positive.

As is well known the degree of definition which can be produced with apparatus of this type is limited by two concurrent effects. The first of these effects is dependent upon the circuitry employed in the system as a whole, as such circuitry serves to limit the band of frequencies which can be transmitted to produce the picture. It has been shown and is generally accepted that the smallest element which can be resolved by an otherwise theoretically perfect television system is limited in size to the distance swept out by the scanning beam in one quarter cycle of the highest frequency which the system will transmit. Because of the necessity of conserving communication channels present day standards require that this maximum frequency be limited substantially to four megacycles. This limitation means that the smallest area which can be resolved by a perfect system operating within this band is very nearly equal to 1/437 of the length of the scanning line.

The second limitation is the so-called "aperture effect." This effect is due to the finite size of the scanning element (originally an aperture) at both transmitter and receiver. It can easily be shown that if a scanning aperture is swept transversely across a pattern of alternating light and dark bars, the aperture being of precisely the size to embrace a bar, there will be no change of illumination through the aperture as it progresses. The same general effect obtains when a scanning cathode beam traverses a charge image having a like dimensional relation to the beam. The smallest element to produce a signal with full intensity is one wherein the light or dark bar, as the case may be, exactly fills the aperture at some instant. So far as appearance is concerned even such a signal is reproduced at an apparent decrease in intensity since the eye integrates the light falling on it for periods less than the persistence of vision and the intensity of illumination produced by the beam reaches the maximum only at the single instant where the beam exactly covers the charge representative of the picture.

A closely related effect occurs when a transition between a dark and a light area, or vice versa, is scanned. The light, or the current produced by corresponding charge, increases as the leading edge of the scanning element first strikes the line of transition and increases until the trailing edge of the scanning element is likewise past the transition line. In either case the effect upon the signal is to eliminate the higher frequency components which would be generated by a theoretical scanning point and the signal generated is almost indistinguishable from one in which the higher frequencies have been eliminated by a filter, provided a round scanning beam or aperture is used. With elements of other shapes other components may be generated but visually there is little difference.

Aperture effect at the transmitter therefore has very little deleterious effect on the transmitted signal as long as the length of the scanning element, along the line of scan, is less than 1/437 of the picture field, since in that case the limits imposed by the aperture and by regulations regarding band width are substantially the same.

A precisely similar effect, however, occurs at the receiver, as a result of which any transition from dark to light or the reverse is spread out over the width of the receiver scanning beam in addition to the spreading caused by the transmitter scanning area, the legal frequency limitation, or both. On a sharp transition from dark to light or vice versa, this may actually improve the appearance of the image by making the latter part of the transition steeper. In the resolution of small areas, however, it also serves to cut down the apparent illumination by spreading the instantaneous peak which occurs at the instant the scanning element exactly covers the small area over the entire larger area of the receiver scanning beam.

All of these effects conspire to produce blurred edges on television images. To some extent they can be compensated by "peaking" the amplifiers at the receivers, making them more responsive to the higher frequency components. Such peaking, however, is very likely to introduce transient effects, usually in the form of successive light and dark halos, bordering the televized images on the advancing side of the scanning beam. It has been found, moreover, that much of the eye strain and discomfort of which many television viewers complain can be traced to the blurred edges produced. Apparently the eye interprets such blurrings as being due to its own failure to focus and makes constant efforts to correct such failure, in which, of course, it is again unsuccessful. It is probably for this reason that many viewers prefer to watch television pictures from distances greater than those at which maximum theoretical resolution can be obtained.

In view of the above, among the objects of my invention are to provide means whereby substantially the full theoretical resolution of a television receiver may be sensibly obtained; to provide a means whereby blurring of the edges of television images is reduced to a negligible minimum; to provide a means of securing increased resolution in a television system without introduction of disturbing transients; to provide a device wherein the benefits above enumerated may be applied to existing receivers at a relatively low cost, and to accomplish the above through a simple modification of the scanning system.

Considered broadly my invention involves modifying the deflection of the scanning beam of a television receiver, in the direction in which the lines are scanned, in proportion to the rate of change of illumination, from point to point along the picture line, or, what is the same thing, in accordance with the rate of change of the electrical wave which modulates the scanning beam. The modification of the deflection rate is in such sense that the deflection of the scanning beam in its direction of travel increases when illumination is increasing and decreases when illumination is decreasing. If desired, two additional features may be included, although experiment has shown that the device as simply as above stated is very satisfactory. The first such modification is to provide means for additionally varying the intensity of the scanning beam as a function of its increase in velocity. The second is to vary the amount by which the deflection rate is modified in accordance with the average or background level of the picture to be produced, by means of an automatic gain control which sets the gain in accordance with the background level of the picture.

Figures 2A, 2B:
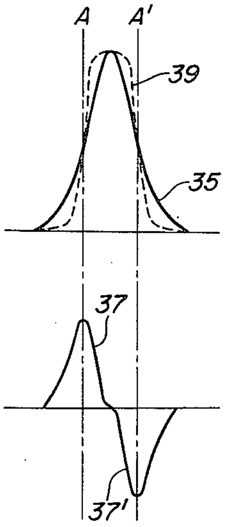

The above will be more readily understood from the following description, taken in connection with the accompanying drawings wherein:

Fig. 1 is a diagram, partly schematic and partly in block, of a television receiver supplied with the device of this invention;

Fig. 2*a* is a set of curves illustrating the illumination of a band of slightly over the minimum resolvable width, with and without the device of this invention; and Fig. 2*b* is a curve representing generally the first derivative of a signal producing the illumination shown in Fig. 2*a*.

Fig. 1 shows in block a conventional television receiver 1 fed by an antenna 3 and provided with the usual output circuits for supplying a heater 5, cathode 6, control on modulating grid 7, and first and second anodes 9 and 11, on a conventional cathode ray tube 13 having a luminescent screen 15. Circuits are also provided in the receiver for supplying horizontal deflection coils 17 and vertical deflection coils 19 as well as the usual signal circuit connected to the control grid 17. There is also shown a lead 20 which connects to the automatic background control bias with which substantially all television receivers are provided. All so far described is so purely conventional that there appears to be no necessity for discussing it in detail.

Connected to the signal lead 21 which feeds the control grid 7 is a branch circuit 23 which includes a differentiating network. Various such networks have been described in the literature and are well known. The one shown is probably the simplest and cheapest and is illustrated for that reason, but it is to be understood that the type of signal required may be derived from the drop across an inductance as satisfactorily as from the circuit illustrated. The latter comprises a small condenser 25 connected in series with a resistor 27. The actual value of these components is subject to wide variation, but the time constant of the circuit should preferably be less than .25 microsecond. In practice a midget variable condenser having a maximum capacity of the order of 5 mmf. is satisfactory, while the resistor 27 can be of the order of one megohm or more. The time constant can then be set as required.

The differentiating circuit feeds an amplifier which is in this case shown as a pentode 28 resistance-capacity coupled to a triode 29. It is to be understood, however, that this is merely illustrative, since the tubes used may be of almost any types that will give the necessary output power. In the first experiments with this system an ordinary video amplifier was used successfully. The type of tube employed will naturally depend upon the parameters of the cathode ray tube 13, more deflection power being required for the larger size tubes and those using higher accelerating voltages on the beam. For this reason additional tubes may be necessary, or, in other cases, only a single tube may be required, but anyone skilled in the art can make the necessary adaptations.

The tube 29 feeds, illustratively, an auxiliary pair of deflecting coils 31 arranged in the plane of the horizontal deflecting coils 17. With the types of cathode ray now in general use these coils may be composed of a few turns on wire, with a coil diameter of perhaps an inch and one-half, disposed around the neck of the tube immediately beyond the orifice of the electron gun. As a matter of good engineering the coil size and a number of turns should be chosen to match the impedance of the tube but rather wide departures from this ideal are permissible. No provision is shown for excluding the D. C. component of plate current from the coils 31. The total deflection to be produced by these coils is only of the order of the diameter of the scanning spot, or, for a 16 inch screen, about 0.035 inch or about a millimeter. The displacement of the spot due to the D. C. component is therefore negligible.

The circuit as so far described is entirely adequate for most purposes. The effect produced by it is illustrated in Fig. 2*a*, wherein the lines A and A′ are assumed to represent transitions, respectively, from dark to light and from light to dark, in a distance along the line of scanning substantially equal to the dimension of the scanning element in that direction. In Fig. 2*a* the curve 35 illustrates the variation of illumination across the strip produced by a scanning beam travelling at constant velocity. It will be seen that the brightness starts to increase one beam-width back from the transition and reaches approximately half value when the beam is half way over the transition line. From this point it rises to full value only instantaneously and then starts to drop immediately, again reaching the half illumination value when the beam is half way across the strip and falling to its final value only when the beam has completely left the final transition line. Moreover, the eye integrates these effects over the entire interval and is, furthermore, more sensitive to contrasts than it is to absolute values. Therefore, assuming that the width between A and A′ is the minimum that the eye can resolve, the apparent brightness of the area is reduced and the element is blurred out over several times the width of minimum resolution; the edges look "fuzzy."

The curve of Fig. 2*b* illustrates the rate-of-change of the electric wave producing these effects, i. e., it shows the first derivative of the mathematical curve representing the signal wave for this interval. As is well known the derivative curve rises with increasing rapidity as long as the rate of change is increasing, and starts to fall as soon as the rate of change starts to decrease, reaching zero again when the current reaches its maximum. This is illustrated by the positive branch 37 of Fig. 2*b*. When the second point of transition is reached the curve repeats in reverse as is shown by the branch 37′, reaching zero at the instant the new level of constant value is reached.

With the arrangement as shown a current is generated in the auxiliary scanning coils which is proportional to the curve of Fig. 2*b*. Accordingly, as soon as the voltage applied to the grid 7 starts to rise an additional deflection is given to the beam, causing the illumination to follow the dotted curve 39 of Fig. 2*a*. In effect the beam jumps forward with the increase of current, until it substantially has cleared the transmission line. At this point the current in the auxiliary coils start to fall, but since the normal deflection is continuing the beam does not necessarily move backward but remains substantially stationary until the field due to the usual deflecting coils has caught up with it. When the opposite transition point is reached the effect is just the opposite; the scanning spot remains nearly stationary while the beam modulating potential is falling but as soon as the potential has reached its final value the negative pulse of current in the auxiliary coil dies away and the beam is speeded up to its normal position. On gradual transitions the effect is so small as to be unnoticeable. On small abrupt changes the effect is somewhat less but the eye resolves such changes less clearly in any event and does not perceive the difference in sharpness of image.

With excess amplification used to drive the current in the auxiliary coils it is possible to overdo the matter and make the beam actually move backward on the sharply descending branches of the curve of Fig. 2*b*. This effect is not desirable but it is not nearly as troublesome as might at first appear; the effect is to outline the edges of bright areas with a still brighter border and to contrast against this a darker line upon transition from light to dark, in cases where the dark is not completely black. Proper adjustment of amplification normally takes care of this entirely satisfactorily so that the device next to be described is not necessary. It may be used if desired, however, to correct some secondary defects which might be troublesome with certain special types of picture. The purpose of this additional equipment is to provide maximum speed across the transition line and at the same time prevent the formation of the bright and dark lines just referred to above. The equipment illustrated is simply a means of mixing the derivative signal with the original picture signal in such manner as to increase the luminoscity of the scanning spot in proportion to its variation in velocity. Perfect compensation may be accomplished by this means without the danger of the bright line outline that has been mentioned. When introducing the additional signal it is usually preferable that a buffer amplifier be used, and since the polarity of the original picture signal must not be reversed there is shown as a phase inverter tube section 38 of a double triode tube. The other section 39 of this triode is provided with a plate resistor 40 connected in common with the anode of another triode 41, the latter tube being fed by the derivative signal from tube 29. The resistor 40 therefore acts as a mixer for the two signals.

To operate the device the switch 42 is thrown to the dotted position, in which case the direct connection from the lead 21 to the modulating grid 7 is interrupted, the control electrode now being connected across the resistor 40. The joint amplification of the tube sections 38 and 39 should be substantially unity. The amplification of the tube 41 depends upon the voltage at which the deflecting coils 31 are supplied, and the actual amount used is usually more easily found by experiment than calculated. The circuits are simply adjusted until the picture is most pleasing.

A further refinement is provided by using a variable m$\mu$ tube instead of one having a sharp cutoff as the tube 28 and varying the bias on this tube in accordance with the background setting or black level bias provided through the lead 20 of the television receiver 1. This arrangement serves to prevent over control or under control in scenes of various background level. While this refinement is not necessary to produce a material improvement in the picture it is so easily applied that its inclusion is well worth while.

The effect of the device as herein described is, in many instances, quite startling. It is particularly noticeable when the picture to be transmitted includes printed matter. In one of the first tests of the device it was found that in viewing a televised baseball game the score board could be read quite easily when the device was connected but was utterly illegible in its absence. In cases where no such readily identifiable effects are produced the television pictures appear merely "easier to look at" owing to the fact that lines of demarcation are sharper and there is no attempt on the part of the eye to focus the blurred images.

A somewhat unexpected effect is notable where the signal is heavily contaminated with noise. Transmissions which were intolerable with constant speed scanning became rather good when viewed with the variable speed scanning produced by this invention. The effects produced depend somewhat upon the nature of the transmission as well as the nature of the interference. Showings containing considerable detail are usually greatly improved. On the other hand where there are wide expanses lacking in detail noise which would otherwise not be noticed may appear as a fine structure of wavy lines which are, however, visible only at a less distance than can be normally tolerated with constant speed scanning, owing to the strain of attempting to correct for the blurred edges so clearly apparent at such short distances.

It should be evident that while the use of the auxiliary coils 31 is convenient, it would be perfectly possible to inject the rate-of-change potential directly into the regular scanning coils. The auxiliary coils are preferred, however, because of the extremely simplified circuits that can be used in this manner and because the small amount of deflection required is readily produced with relatively small power. The maximum deflection ever required is equal to a single picture element. As has been mentioned above, with a sixteen inch cathode ray tube, having a horizontal line length of 14 to 15 inches, this amounts to slightly under 0.035 inch, or less than a millimeter. The additional power for this can normally be secured without difficulty from the regular power supply of the receiver, without addition. This modesty of requirement makes the application of the invention to both new and existing receiver extremely easy and presents a wide choice to the designing engineer. For instance, when the device is applied to new receivers it is unnecessary to use an inverter tube when applying the derivative potential to the control grid 7, the detector-amplifier chain being merely so designed as to give the final amplification at the proper level and polarity.

While the most general use of this invention is in television its advantages may also be realized in other applications where scanning is employed as, for example, in radar and in navigational systems.

The examples here given are therefore to be considered merely illustrative of the invention as defined in the following claims.

I claim:

1. A device for improving the resolution of television receivers employing a cathode ray tube, means for deflecting the beam of said tube bidimensionally at a field scanning rate and a line scanning rate respectively, means for modulating the intensity of said beam and a signal circuit for actuating said modulation means: comprising an auxiliary means for deflecting said cathode ray beam in the line scanning direction, a differentiating circuit for connection to said signal circuit to derive therefrom impulses proportional to the rate of change of the signal in said signal circuit, and connections from said differentiating circuit to said auxiliary deflecting means to vary the speed of scanning in accordance with the rate of change of said signal.

2. A device in accordance with claim 1 including means for feeding back into said modulating means a rate of change signal in such sense as to vary the intensity of the cathode ray beam substantially in direct proportion to the acceleration in scanning imparted thereto by said auxiliary means.

3. A device in accordance with claim 2 wherein said feeding-back means includes a buffer amplifier for connection between said signal circuit and said modulating means, and a circuit connecting from said differentiating circuit to said modulating means and isolated from said signal circuit by said buffer amplifier.

4. In combination with a television receiver which comprises a cathode ray display tube, means for deflecting a cathode ray developed by said tube to cause motion thereof in line and field directions with respect to a picture field and means for modulating said beam to develop a television image; a circuit for supplying picture signals to said modulating means, a differentiating network connected to said circuit, an amplifier connected to said network, and an output circuit for said amplifier connected to deflect said beam in the line direction at an increased rate upon an increase in intensity of said beam.

5. The combination recited in claim 4 including means for feeding a signal from said differentiating network to said modulating means superimposed on said first mentioned signal and in a sense to increase the intensity of said signal with increase in rate of deflection of said beam.

ERNEST O. LAWRENCE.

REFERENCES CITED

The following references are of record in the file of this patent:

UNITED STATES PATENTS

| Number | Name | Date |
|---|---|---|
| 2,077,574 | Maloff | Apr. 20, 1937 |
| 2,098,390 | Iams | Nov. 9, 1937 |
| 2,284,378 | Dome | May 26, 1942 |
| 2,395,966 | Goldberg | Mar. 5, 1946 |
| 2,414,546 | Nagel | Jan. 21, 1947 |
| 2,485,569 | Coughlin | Oct. 25, 1949 |